United States Patent [19]
Machida

[11] Patent Number: 5,652,380
[45] Date of Patent: Jul. 29, 1997

[54] APPARATUS AND METHOD FOR DETECTING OUTPUT FLUCTUATIONS OF AN INTERNAL COMBUSTION ENGINE, AND APPARATUS AND METHOD FOR CONTROLLING THE ENGINE

[75] Inventor: Kenichi Machida, Atsugi, Japan

[73] Assignee: Unisia Jecs Corporation, Kanagawa-ken, Japan

[21] Appl. No.: 603,851

[22] Filed: Feb. 22, 1996

[30] Foreign Application Priority Data

Feb. 24, 1995 [JP] Japan ................................. 7-037215

[51] Int. Cl.$^6$ ............................. F02D 41/14; F02D 45/00; G01M 15/00
[52] U.S. Cl. ............................. 73/116; 73/115; 73/117.3; 123/435; 364/431.03
[58] Field of Search ................................. 73/115, 116, 117.2, 73/117.3; 364/431.03; 123/435, 419, 425, 436, 378

[56] References Cited

U.S. PATENT DOCUMENTS

| | | | |
|---|---|---|---|
| 4,802,454 | 2/1989 | Tanaka | 73/115 |
| 4,885,935 | 12/1989 | Feller et al. | 73/117.2 |
| 4,892,075 | 1/1990 | Iriyama et al. | 73/115 |
| 5,069,183 | 12/1991 | Nagano et al. | 73/117.3 |
| 5,386,722 | 2/1995 | Meyer et al. | 73/115 |
| 5,499,607 | 3/1996 | Tomisawa | 73/116 |

FOREIGN PATENT DOCUMENTS 63-17432  2/1988  Japan.

*Primary Examiner*—George M. Dombroske
*Attorney, Agent, or Firm*—Lowe, Price, LeBlanc & Becker

[57] ABSTRACT

A standard deviation and mean value of a value for the cylinder pressure integrated over a predetermined interval are computed. A value for the standard deviation divided by the mean value is then made an index value for judging a limit of output fluctuations. When the index value is less than a predetermined value corresponding to the output fluctuations, then weakening of the air-fuel ratio and retarding of the ignition timing is proceeded, while when the index value is equal to or greater than the predetermined value, it is judged that the limit of the output fluctuations has been exceeded, and the air-fuel ratio is corrected to the rich side, and the ignition timing is corrected to the advance side.

12 Claims, 8 Drawing Sheets

APPARATUS AND METHOD FOR DETECTING OUTPUT FLUCTUATIONS OF AN INTERNAL COMBUSTION ENGINE, AND APPARATUS AND METHOD FOR CONTROLLING THE ENGINE

FIELD OF THE INVENTION

The present invention relates to an apparatus and method for detecting output fluctuations of an internal combustion engine, and to an apparatus and method and for controlling the engine. In particular, the present invention relates to technology for judging an output fluctuation limit based on an integral value of cylinder pressure over a predetermined interval, and for controlling the engine based on the judgment results.

DESCRIPTION OF THE RELATED ART

Heretofore, with engine control systems, the engine surge-torque (torque fluctuations) is detected, and the air-fuel ratio and ignition timing optimally adjusted based on the surge-torque.

For example, if under idle conditions immediately after start-up, the air-fuel ratio is made lean and the ignition timing retarded within a range wherein the surge-torque does not exceed the operating limits, then the emission quantity of the exhaust gas pollutants can be suppressed due to the weakened air-fuel ratio, and the exhaust temperature increased due to the retarded ignition timing to thereby hasten activation of the exhaust gas purification catalytic converter. As a result, the exhaust properties immediately after start-up can be improved.

The surge-torque is detected based on fluctuations in the engine rotational speed, or fluctuations in the cylinder pressure or an integral value of the cylinder pressure.

With the surge-torque (torque fluctuations) however, for example in its correlation with the air-fuel ratio, since this exhibits a rapid rise with weakening of the air-fuel ratio once a certain air-fuel ratio is exceeded, it is difficult to accurately detect the limit of the output fluctuations after this rise. Hence weakening the air-fuel ratio to the maximum limit becomes difficult.

SUMMARY OF THE INVENTION

In view of the foregoing, it is an object of the present invention, in a construction which judges a limit of the output fluctuations of an engine based on engine cylinder pressure, to be able to judge the output fluctuation limit to a high accuracy.

It is a further object to be able to accurately adjust the air-fuel ratio and ignition timing of the engine based on the judgment results for the output fluctuation limit.

To achieve the above objects with the apparatus and method according to the present invention for detecting output fluctuations of an internal combustion engine, the construction includes; integrating the cylinder pressure of the engine over a predetermined integration interval, and respectively computing the standard deviation and mean value of the cylinder pressure integral value during a predetermined number of cycles, and judging a limit of the output fluctuations using a value of the standard deviation divided by the mean value as an index valve.

With the index valve obtained by dividing the standard deviation by the mean value, on considering its correlation with the air-fuel ratio which is representative of the combustion conditions, since the abovementioned mean value decreases with weakening of the air-fuel ratio, then the index value gradually increases with weakening of the air-fuel ratio, even in an air-fuel ratio region wherein the standard deviation (torque fluctuations) shows practically no change. On the other hand, in an air-fuel ratio region where the standard deviation increases with weakening of the air-fuel ratio, the reduction of the mean value with weakening of the air-fuel ratio, and the reduction of the mean value due to the combustion becoming unstable, operate together so that a sudden rise of the index value is suppressed. As a result, the index value shows a comparatively gentle change throughout from before to after the output fluctuation limit, thus facilitating specification of the output fluctuation limit. Moreover, even if scatter occurs in the cylinder pressure integral value, by setting the predetermined number of cycles for computing the standard deviation and the mean value comparatively long, then the influence from this scatter can be excluded.

Furthermore, with the apparatus and method according to the present invention for detecting the output fluctuations of an internal combustion engine, the construction includes; integrating the cylinder pressure of the engine over a predetermined integration interval, and computing a maximum value, a minimum value and a mean value of the cylinder pressure integral value for a predetermined number of cycles, and judging a limit of the output fluctuations using a value of the difference between the maximum value and the minimum value divided by the mean value as an index value.

With such a construction, the difference between the maximum and the minimum values shows a change virtually corresponding to the standard deviation. Hence the index value shows a comparatively gentle change throughout from before to after the output fluctuation limit, thus facilitating specification of the output fluctuation limit.

Moreover, with the apparatus and method according to the present invention for controlling an internal combustion engine, the construction includes controlling at least one of the ignition timing and the air-fuel ratio of the internal combustion engine, based on the judgment results for the output fluctuation limit, based on the index value.

With such a construction, the ignition timing can be retarded, and the air-fuel ratio can be weakened up until the limit of the output fluctuations.

Here the construction is preferably such that at least one of the ignition timing and the air-fuel ratio of the internal combustion engine is controlled only under non active conditions of an exhaust gas purification catalytic converter and during idling of the engine.

With such a construction, under the idling conditions immediately after start-up, the ignition timing is retarded and the air-fuel ratio weakened up to the limit of the output fluctuations. Therefore, the catalytic converter activity can be increased so that exhaust properties immediately after start-up can be improved.

Moreover, the apparatus and method according to the present invention for controlling an internal combustion engine includes, integrating the cylinder pressure of the engine over a predetermined integration interval, computing the standard deviation of the cylinder pressure integral value during a predetermined number of cycles, and computing the mean value of the cylinder pressure integral value during the predetermined number of cycles, then computing for each predetermined number of update cycles, a value of the standard deviation divided by the mean value as an index value for judging the output fluctuation limit, judging the output fluctuation limit based on the index value, and controlling at least one of the ignition timing and the air-fuel ratio of the internal combustion engine based on the judgment result. Moreover, the construction includes; computing the mean value of the index value during a predetermined number of cycles for each predetermined number of update cycles which is longer than the update number of cycles of the index value, judging the output fluctuation limit based on the mean value of the index value, and controlling at least one of the ignition timing and the air-fuel ratio of the internal combustion engine based on the judgment results.

With such a construction, the index value obtained by dividing the standard deviation by the mean value is updated/computed for the comparatively small number of cycles, and the air-fuel ratio and/or ignition timing is controlled for each update. On the other hand, the mean value of the index value is computed for the number of cycles which is larger than the number of update/computation cycles for the index value, and the air-fuel ratio and/or ignition timing is controlled for each update of the mean value of the index value.

In order to avoid the influence from the scatter in the cylinder pressure integral value, it is necessary to compute the index value based on a cylinder pressure integral value during the larger number of cycles. As a result, it becomes necessary to store a great number of cylinder pressure integral values. Therefore, instead of computing the index value based on the cylinder pressure integral value during the comparatively small number of cycles, the mean value of the index value is computed, thus giving a value in which the influence from scatter in the cylinder pressure integral value has been sufficiently avoided. Furthermore, elimination of the part influenced by scatter can be achieved by controlling the engine for a relatively long control period based on the mean value of the index value, while ensuring control response by controlling the engine for relatively short control periods based on the index value.

Here the construction preferably includes; judging the output fluctuation limit by comparing the index value or a mean value of the index value with a predetermined value, and controlling at least one of the ignition timing and the air-fuel ratio of the internal combustion engine so that the index value or the mean value of the index value approaches the predetermined value.

With such a construction, retarding of the ignition timing or weakening of the air-fuel ratio can be carded out to the maximum limit by setting the predetermined value to a value corresponding to the limit of the output fluctuations.

Moreover, the construction may be such that when, based on the mean value of the index value, it is judged that the output fluctuation limit is exceeded, the control based on the index value is terminated until the next update/computation timing of the mean value of the index value.

With such a construction, by computing the mean value which is based on a larger number of cylinder pressure integral values than the index value, then data of higher reliability is possible. Therefore when based on the mean value of the index value, it is judged that the output fluctuation limit has been exceeded, control based on the index value is stopped, so that control to weaken the air-fuel ratio and to retard the ignition timing is not further carried out by the control based on the index value.

Furthermore, the construction preferably includes; judging a limit of the output fluctuations only under non active conditions of the exhaust gas purification catalytic converter and at the time of idling of the engine, and controlling at least one of the ignition timing and the air-fuel ratio of the internal combustion engine.

With such a construction, by retarding the ignition timing and weakening the air-fuel ratio under idling conditions immediately after start-up until the limit of the output fluctuations is reached, the activation of the catalytic converter can be increased and exhaust properties immediately after start-up improved.

Other objects and aspects of the present invention will become apparent from the following description of embodiments given in conjunction with the appended drawings.

DETAILED DESCRIPTION OF THE PREFERRED EMBODIMENTS

Figure 1:
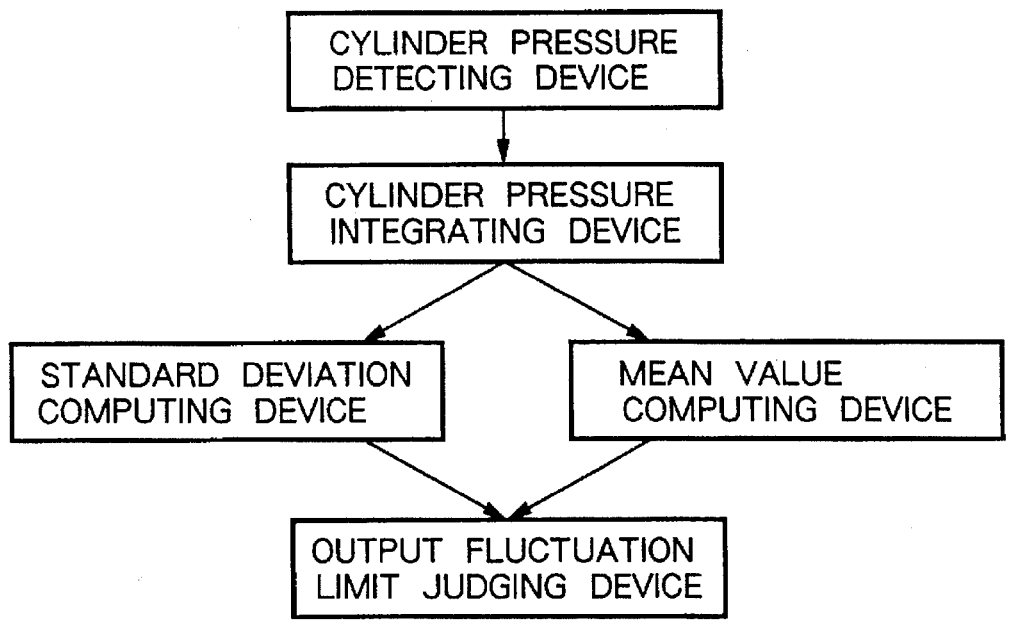
FIG. 1 is a block diagram of an output fluctuation detection apparatus according to claim 1.
Figure 2:
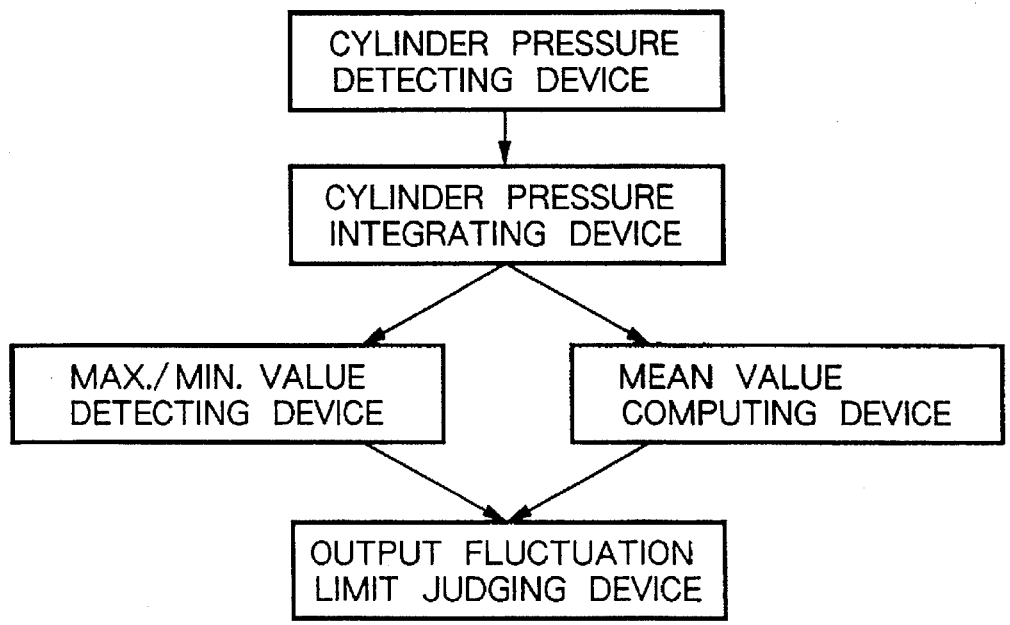
FIG. 2 is a block diagram of an output fluctuation detection apparatus according to claim 4.

FIGS. 1 and FIGS. 2 are block diagrams respectively illustrating the basic construction of apparatus for detecting the output fluctuations of an internal combustion engine according to claims 1 and 4.

With the construction of FIG. 1, a cylinder pressure detecting device detects the cylinder pressure of the engine, while a cylinder pressure integrating device integrates the cylinder pressure detected by the cylinder pressure detecting device, over a predetermined integration interval to obtain a cylinder pressure integral value.

Furthermore, a standard deviation computing device computes a standard deviation of the cylinder pressure integral value during a predetermined number of cycles.

Moreover, a mean value computing device computes a mean value of the cylinder pressure integral value during the predetermined number of cycles.

Finally, an output fluctuation limit judging device judges an output fluctuation limit, using a value of the standard deviation divided by the mean value as an index value.

With the construction of FIG. 2, a cylinder pressure detecting device detects the cylinder pressure of the engine, while a cylinder pressure integrating device integrates the cylinder pressure detected by the cylinder pressure detecting device, over a predetermined integration interval to obtain a cylinder pressure integral value.

Moreover, a maximum and minimum value detecting device detects respective maximum and minimum values of the cylinder pressure integral value during a predetermined number of cycles.

Furthermore, a mean value computing device computes a mean value of the cylinder pressure integral value during the predetermined number of cycles.

Finally, an output fluctuation limit judging device judges an output fluctuation limit, using a value of the difference between the maximum and minimum values divided by the mean value as an index value.

Figure 3:
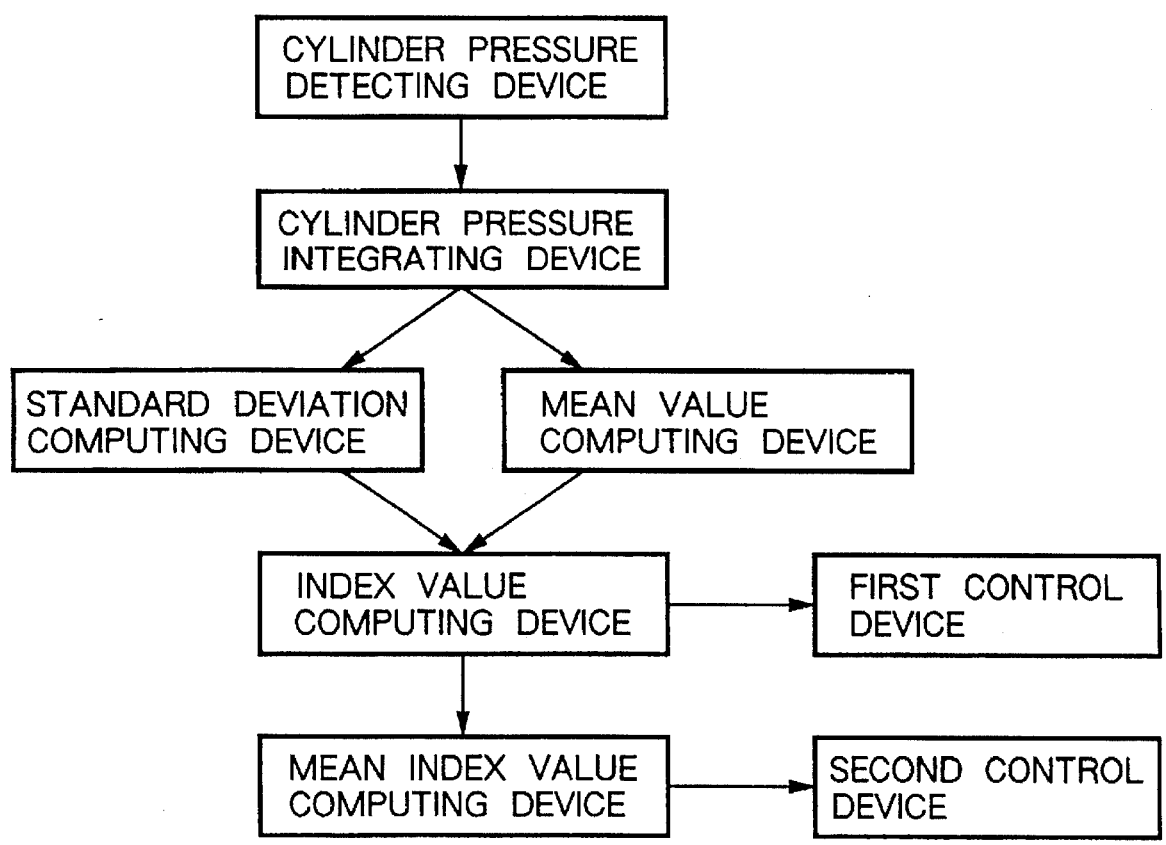
FIG. 3 is a block diagram of a control apparatus according to claim 7.

FIG. 3 is a block diagram showing the basic construction of a control apparatus for an internal combustion engine according to claim 7.

With the construction of FIG. 3, a cylinder pressure detecting device detects the cylinder pressure of the engine, while a cylinder pressure integrating device integrates the cylinder pressure detected by the cylinder pressure detecting device, over a predetermined integration interval to obtain a cylinder pressure integral value.

Furthermore, a standard deviation computing device computes a standard deviation of the cylinder pressure integral value during a predetermined number of cycles, while a mean value computing device computes a mean value of the cylinder pressure integral value during the predetermined number of cycles.

Here, an index value computing device computes a value of the standard deviation divided by the mean value for each predetermined number of update cycles, as an index value for judging the output fluctuation limit.

Then, a first control device carries out judgment of the output fluctuation limit, based on the index value, and controls at least one of the ignition timing and the air-fuel ratio of the internal combustion engine, based on the judgment results.

On the other hand, a mean index value computing device computes a mean value of the index value during a predetermined number of cycles, for each predetermined number of update cycles which is larger than the number of update cycles for the index value in the index value computing device.

Then, a second control device carries out judgment of the output fluctuation limit, based on the mean value of the index value, and controls at least one of the ignition timing and the air-fuel ratio of the internal combustion engine, based on the judgment results.

As follows is a description of a basic embodiment of an output fluctuation detection apparatus and a control apparatus for an internal combustion engine having the above-mentioned basic construction, as well as a description of an output fluctuation detection method and control method.

Figure 4:
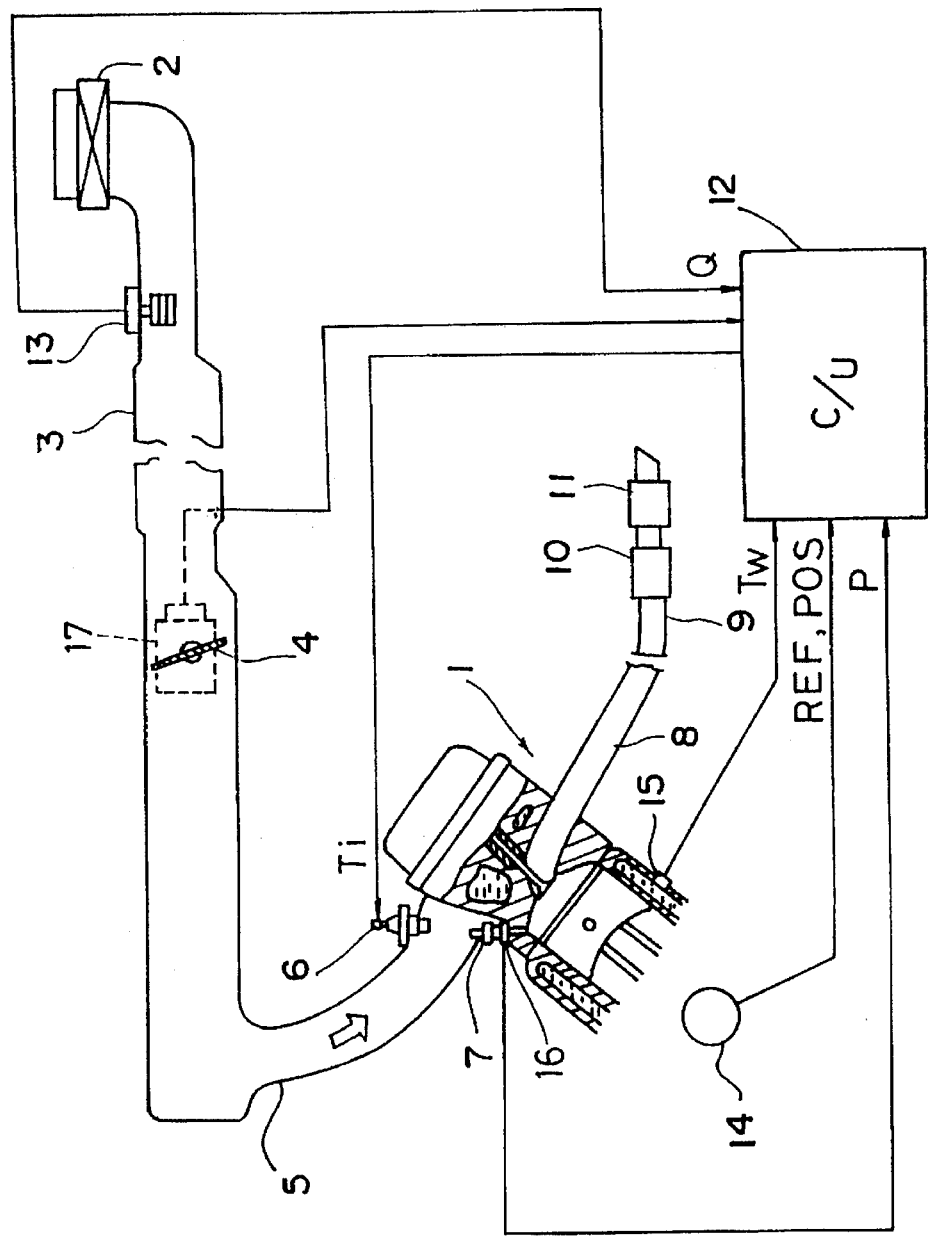
FIG. 4 is a schematic system diagram of an internal combustion engine of an embodiment.

With a first embodiment shown in FIG. 4, air is drawn into an internal combustion engine 1 from an air cleaner 2, by way of an intake duct 3, a throttle valve 4, and an intake manifold 5. Fuel injection valves 6 are provided for each cylinder in respective branch portions of the intake manifold 5. The fuel injection valves 6 are solenoid type fuel injection valves 6 which open with power to a solenoid and close with power shut-off. The fuel injection valves 6 are electrically controlled to open in response to a drive pulse signal from a control unit 12 (to be described later) so that fuel, pressurized by a fuel pump (not shown) and controlled to a predetermined pressure by means of a pressure regulator, is injected intermittently to the engine 1.

Ignition plugs 7 are provided for each combustion chamber of the engine 1 for spark ignition of a mixture therein. Exhaust from the engine 1 is then discharged by way of an exhaust manifold 8, an exhaust duct 9, a catalytic converter 10 and a muffler 11.

The control unit 12, provided for electrical control of the fuel supply to the engine, incorporates a microcomputer having a CPU, ROM, RAM, A/D converter and input/output interface. Input signals from the various sensors are received by the control unit 12, and computational processing carried out (as described later) to thereby control the operation of the fuel injection valves 6.

For the various sensors there is provided in the intake duct 3, an airflow meter 13, which outputs a signal corresponding to an intake air flow rate Q of the engine 1.

Also provided is a crank angle sensor 14 which outputs a reference crank angle signal REF for each reference crank angle position (for example for each TDC), and a unit crank angle signal POS for each 1° or 2°. The period of the reference crank angle signals REF, or the number of unit crank angle signals POS within a predetermined period is measured to compute the engine rotational speed Ne.

Moreover, a water temperature sensor 15 is provided for detecting the cooling water temperature Tw in a water jacket of the engine 1.

Furthermore, provided for each of the ignition plugs 7 are cylinder pressure sensors 16 (cylinder pressure detecting device: refer to FIGS. 1–3) made from a piezoelectric element fitted as a washer to the ignition plug 7, such as disclosed in Japanese Unexamined Utility Model Publication No. 63-17432, for detecting the cylinder pressure (combustion pressure) of each cylinder. With the cylinder pressure sensors 16, instead of the abovementioned type which is fitted as a washer to the ignition plug 7, these may be a type wherein the sensor portion faces directly into the combustion chamber to detect the cylinder pressure as an absolute value.

Provided for the throttle valve 4 is an idle switch 17, which comes on when the throttle valve 4 is in the fully closed position (idle position).

Here the CPU of the microcomputer incorporated in the control unit 12, computes a basic fuel injection quantity Tp based on the intake air flow rate Q and the engine rotational speed Ne, and corrects the basic fuel injection quantity Tp based on operating conditions such as cooling water temperature Tw and the like, to thereby compute a final fuel injection quantity Ti. An injection pulse signal of a pulse width corresponding to the final fuel injection quantity Ti is then output at a predetermined timing to the fuel injection valves 6, to thereby form a mixture of a predetermined air-fuel ratio.

The ignition timing ADV (ignition advance angle) is set based on the basic fuel injection quantity Tp, which is representative of the engine rotational speed Ne and the engine Icad. The ignition timing for the ignition plugs 7 is then controlled based on the ignition timing ADV.

With regards to the catalytic converter 10, if this does not reach a predetermined activation temperature, then a desired conversion efficiency is not achieved. Therefore under conditions immediately after engine start-up and prior to activation of the catalytic converter, a large amount of exhaust gas pollutants am discharged. Consequently, it is desirable to have a definite rise in the catalytic converter temperature immediately after start-up, so that the amount of exhaust gas pollutants discharged from the engine is reduced.

Therefore, with the present embodiment, during idle operation where the catalytic converter 10 is in the non active condition, and power output is not required, the air-fuel ratio is made lean and the ignition timing is retarded, within a range wherein the output fluctuation limit is not exceeded, to thereby give a definite rise in the catalytic converter temperature and suppress the amount of exhaust gas pollutants produced.

Figure 5:
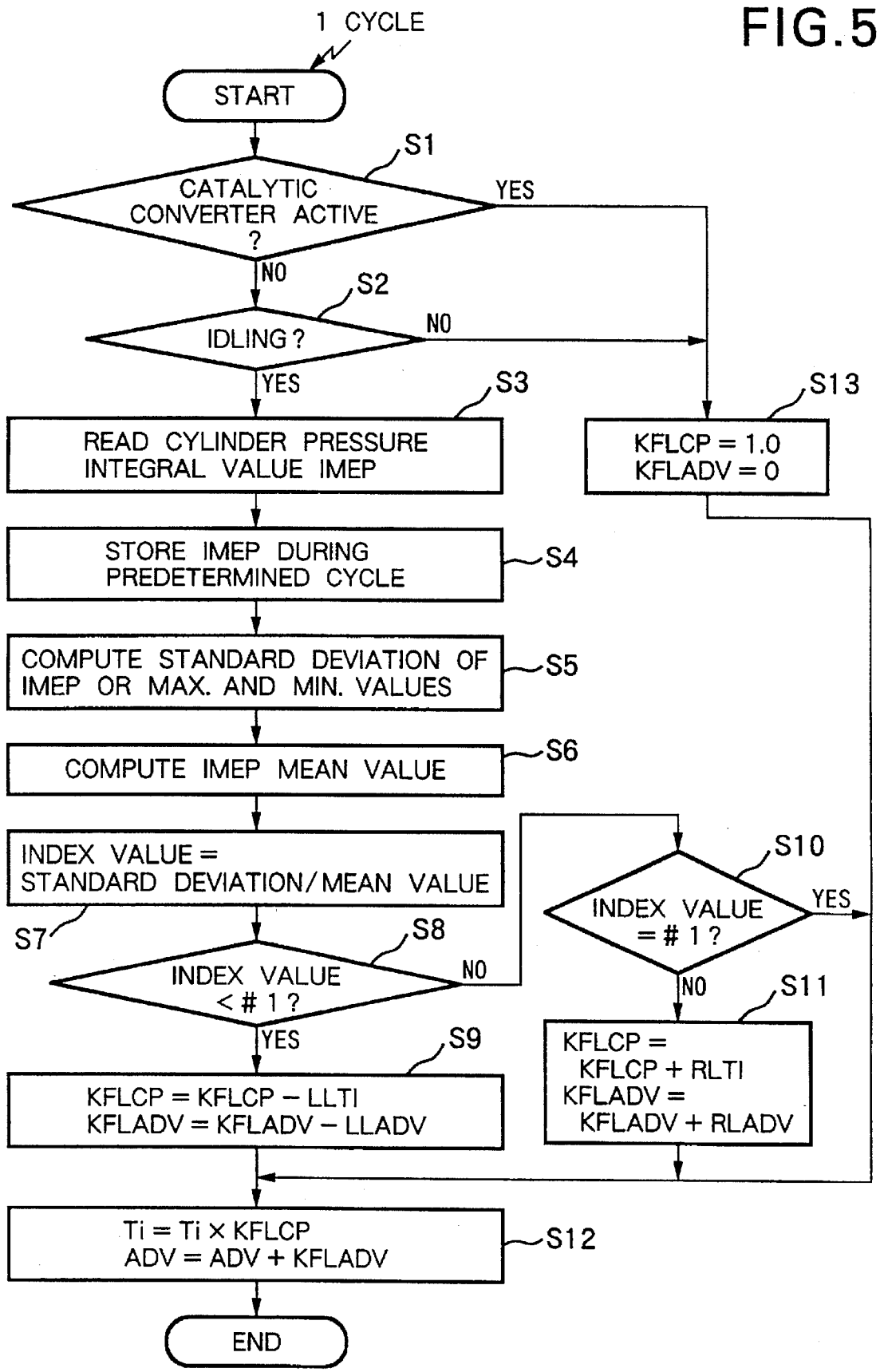
FIG. 5 is a flow chart illustrating the control contents of a first embodiment.

The relevant control is shown basically in the flow chart of FIG. 5.

With the present embodiment, the functions of the cylinder pressure integrating device, the standard deviation computing device, the maximum and minimum value detecting device, the mean value computing device, the output fluctuation limit judging device, and the engine control device (as shown in FIG. 1 and FIG. 2), are realized by software illustrated by the flow chart of FIG. 5 and Stored in the control unit 12.

The program illustrated by the flow chart of FIG. 5 is executed for each single combustion cycle. Initially in step 1 (with "step" denoted by S in the figures), it is judged whether or not the catalytic converter 10 is in a non active condition.

With this judgment, a catalytic converter temperature sensor is provided, and judgment is carried out by considering the condition wherein the temperature of the catalytic converter 10 is less than a predetermined temperature, to be the non active condition, or by considering the condition wherein a temperature correlated with the catalytic converter temperature (for example cooling water temperature Tw or exhaust temperature) is less than a predetermined temperature, to be the non active condition.

In step 1, when the non active condition of the catalytic converter is judged, control proceeds to step 2 where it is judged if there are idling conditions. Basically idling conditions are judged when the engine rotational speed Ne is equal to or less than a predetermined value with the idle switch 17 switched on.

When idling conditions are judged, control proceeds to step 3 where a cylinder pressure integral value IMEP computed during the latest single combustion cycle is read.

The cylinder pressure integral value IMEP is the value for the cylinder pressure detection value for each unit crank angle integrated over a predetermined integration interval. Here the construction may be such that the predetermined integration interval is made the overall interval (720° CA) of a single combustion cycle, and the cylinder pressure integral value IMEP is computed as the mean effective pressure based on the integral value and the intake quantity during the single combustion cycle. Furthermore, the construction may be such the integration interval is made for example from compression TDC-100° CA ATDC, so that only the cylinder pressure occurring under combustion conditions is integrated.

In the following step 4, updating of the stored data for the cylinder pressure integral value IMEP computed during the predetermined number of combustion cycles (for example 1000 combustion cycles) is carried out. Basically, the data during the latest predetermined number of combustion cycles is stored by storing the cylinder pressure integral value IMEP read in step 3 as the latest value in place of the oldest data which is erased.

In step 5, the standard deviation of the cylinder pressure integral value IMEP during the predetermined number of combustion cycles is computed according to equation 1, based on the stored data for the predetermined number of combustion cycles of the cylinder pressure integral value IMEP.

$$\text{Standard deviation} = \sqrt{\frac{1}{n-1}\left\{ \Sigma IMEP^2 - \frac{(\Sigma IMEP^2)}{n} \right\}} \quad (1)$$

where n is the number of samples, ie. a number indicating the number of combustion cycles for which the cylinder pressure integral value IMEP is stored.

In step 5, instead of computing the standard deviation, a construction is possible wherein a maximum value and a minimum value are detected from within the stored data for the predetermined number of combustion cycles of the cylinder pressure integral value IMEP.

In step 6, a mean value of the predetermined number of combustion cycles of the cylinder pressure integral value IMEP (mean value=$\Sigma$IEMP/n) is computed.

In step 7, an index value for judging the output fluctuation limit of the engine is computed as;

Index value=Standard deviation/Mean value, or

Index value=(Maximum value–Minimum value)/Mean value, based on the computation results of steps 5 and 6.

Figure 6:
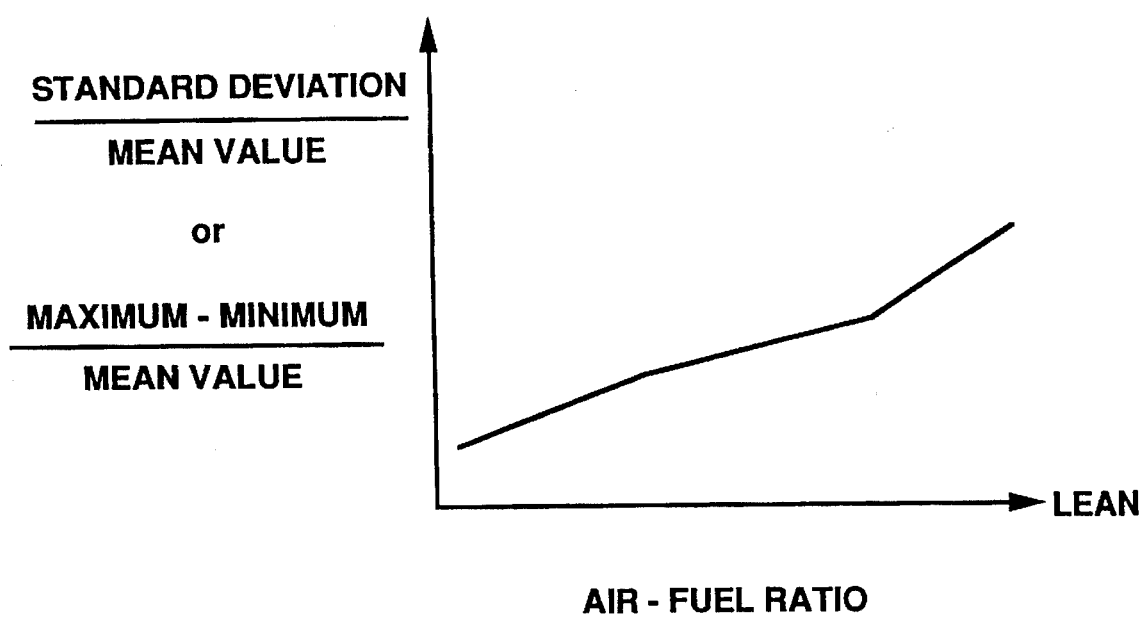
FIG. 6 is a graph illustrating the characteristics of an index value of the first embodiment for showing the output fluctuations.
Figure 9:
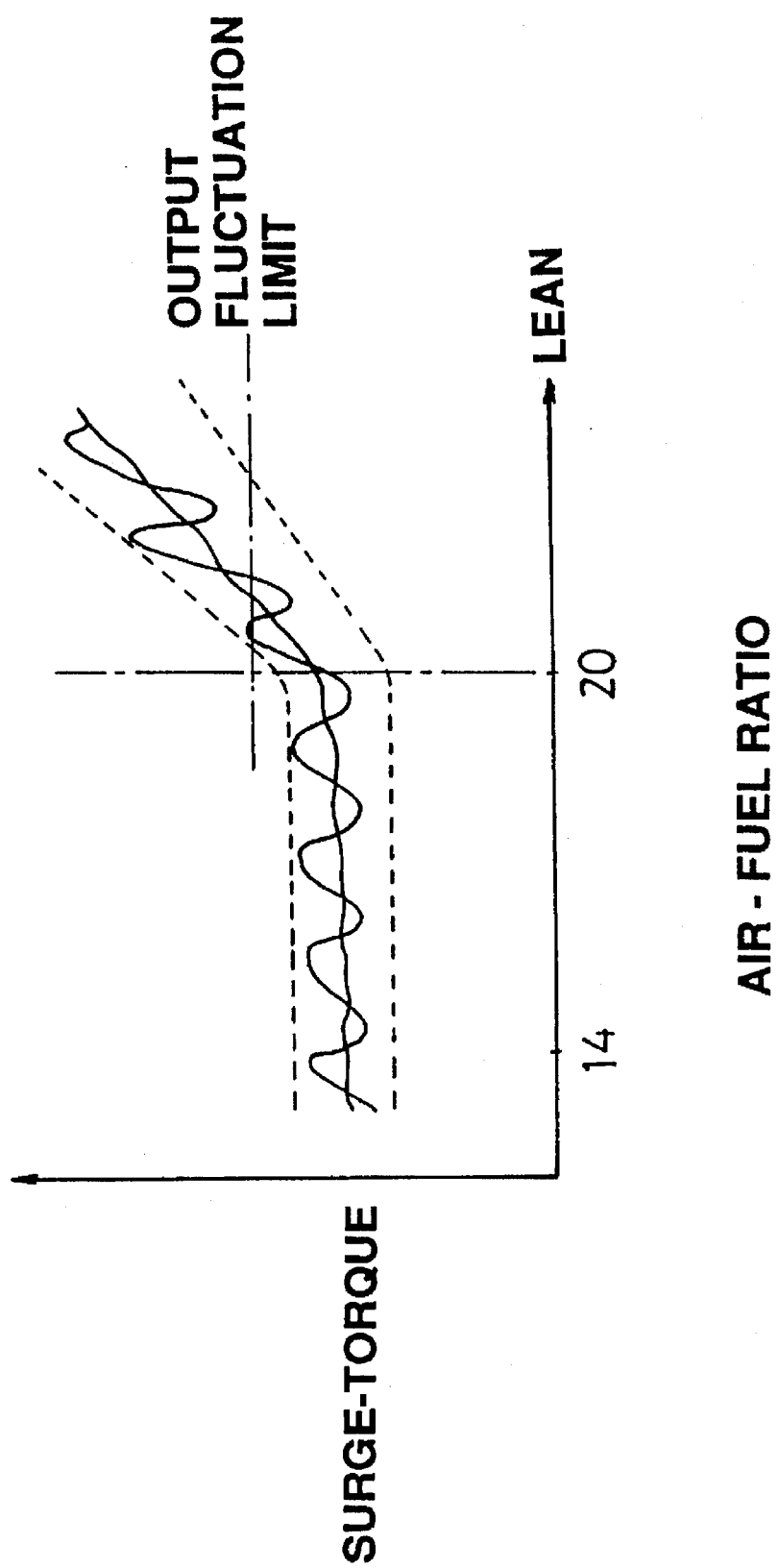
FIG. 9 is a graph illustrating a correlation between surge-torque and air-fuel ratio.

With the surge-torque, for example as shown in FIG. 9 in its correlation with the air-fuel ratio, this exhibits a rapid rise with weakening of the air-fuel ratio once a certain air-fuel ratio is exceeded. With the index value however, for example as shown in FIG. 6 with respect to the air-fuel ratio, this exhibits a gradual increasing change characteristic with weakening of the air-fuel ratio.

That is to say, with the index value obtained by dividing the standard deviation or the maximum value–minimum value by the mean value, since the mean value reduces with weakening of the air-fuel ratio, then the index value gradually increases with weakening of the air-fuel ratio, even in an air-fuel ratio region where the standard deviation, or the maximum value–minimum value, corresponding to the torque fluctuations shows practically no change. On the other hand, in an air-fuel ratio region where the standard deviation, or the maximum value–minimum value, increases with weakening of the air-fuel ratio, the reduction of the mean value with weakening of the air-fuel ratio, and the reduction due to the combustion becoming unstable, operate together so that a sudden rise of the index value is suppressed. As a result, the index value shows a comparatively gentle change throughout from before to after the output fluctuation limit, thus facilitating specification of the output fluctuation limit. Moreover, even if the cylinder pressure integral value IMEP shows scatter for each combustion cycle, by setting the predetermined number of combustion cycles for computing the standard deviation, the maximum value–minimum value, and the mean value, comparatively large (for example 1000 combustion cycles), then the influence from this scatter can be eliminated.

In step 8, the index value and a predetermined value #1 are compared. Here the predetermined value #1 is a value which is set beforehand to correspond to the permissible limits for the output fluctuations. When the index value is equal to or greater than the predetermined value #1, it is judged that the output fluctuations have increased past the operating limit.

Consequently, when the index value is less than the predetermined value #1, it is judged that the output fluctuations have not yet reached the limit level, and hence weakening of the air-fuel ratio and retarding of the ignition timing can be further proceeded. In step 9, a combustion correction coefficient KFLCP by which the fuel injection quantity Ti is multiplied, is therefore reducingly corrected by a predetermined value LLTI. Moreover, an ignition timing correction coefficient KFLADV which is added to the ignition timing ADV, is reducingly corrected by a predetermined value LLADV.

The reduction of the combustion correction coefficient KFLCP is in accordance with the reducing correction direction of the fuel injection quantity Ti, so that the air-fuel ratio is further weakened. Similarity, the reduction of the ignition timing correction coefficient KFLADV is in accordance with the reducing correction direction of the ignition timing ADV (ignition advance angle), so that the ignition timing is further retarded. Consequently, the weakening of the air-fuel ratio and the retarding of the ignition timing is further proceeded by reduction correction of the correction coefficients KFLCP, KFLADV.

On the other hand, when in step 8 it is judged that the index value is not less than the predetermined value #1, control proceeds to step 10 where it is judged if the index value coincides with the predetermined value #1.

If the index value does not coincide with the predetermined value #1, that is to say when it is greater than the predetermined value #1, the weakening of the air-fuel ratio and the retarding of the ignition timing has been proceeded too far. It is therefore judged that the output fluctuation limit has been exceeded, and control proceeds to step 11 to carry out increase correction of the correction coefficients KFLCP, KFLADV.

Basically, this involves increasing the correction coefficients KFLCP, KFLADV by respective predetermined values RLTI, RLADV. Since the increase change in the correction coefficients KFLCP, KFLADV is in accordance with the enriching direction of the air-fuel ratio and the advance direction of the ignition timing, then the air-fuel ratio and the ignition timing are controlled by the increase correction, in a direction to cancel the output fluctuations.

Preferably the predetermined values RLTI, RLADV used in increase correction of the correction coefficients KFLCP, KFLADV, are respectively made larger than the predetermined values LLTI, LLADV used in the reduction correction.

When in step 10, it is judged that the index value coincides with the predetermined value #1, control proceeds to step 12 without increase or decrease correction of the correction coefficients KFLCP, KFLADV being carried out. Consequently, when the index value coincides with the predetermined value #1, the correction values for the air-fuel ratio and the ignition timing are maintained as is.

Referring back to step 1 or step 2, when it is judged that control conditions have not been established, control proceeds to step 13 where the correction coefficient KFLCP is reset to a predetermined value of 1.0, and the correction coefficient KFLADV is reset to an initial value of ø.

With the present embodiment as described above, it is judged if the index value has exceeded the predetermined value #1 to thereby judge if the output fluctuation limit has been exceeded. The air-fuel ratio and the ignition timing are then controlled in a direction so that the index value approaches the predetermined value #1. In this way, the air-fuel ratio can be weakened to the utmost and the ignition timing retarded, within a range wherein the output fluctuation limit is not exceeded.

If the air-fuel ratio is weakened, then the amount of exhaust gas pollutants produced can be reduced. Moreover by retarding the ignition timing and thus hastening activation of the catalytic converter 10, then the exhaust properties immediately after start-up can be improved.

Furthermore, by having a construction wherein the output fluctuation limit is judged based on the index value, then accurate judgment of the output fluctuation limit is possible, thus ensuring control accuracy for the air-fuel ratio and the ignition timing. That is to say, on considering the correlation of the index value, as mentioned before with the air-fuel ratio for example, then since the index value exhibits a gradual change relative to the air-fuel ratio change, it is easier to ascertain a specific level compared to the case wherein the index value exhibits a sudden change. Hence the output fluctuation limit can be judged to a high accuracy.

With the above embodiment, both the air-fuel ratio and the ignition timing are simultaneously controlled, based on the judgment results for the output fluctuation limit based on the index value. However a construction is possible wherein only one is controlled. A construction is also possible wherein at a stage wherein one or other exceeds a previously determined control range, control is changed to the other.

Figure 7:
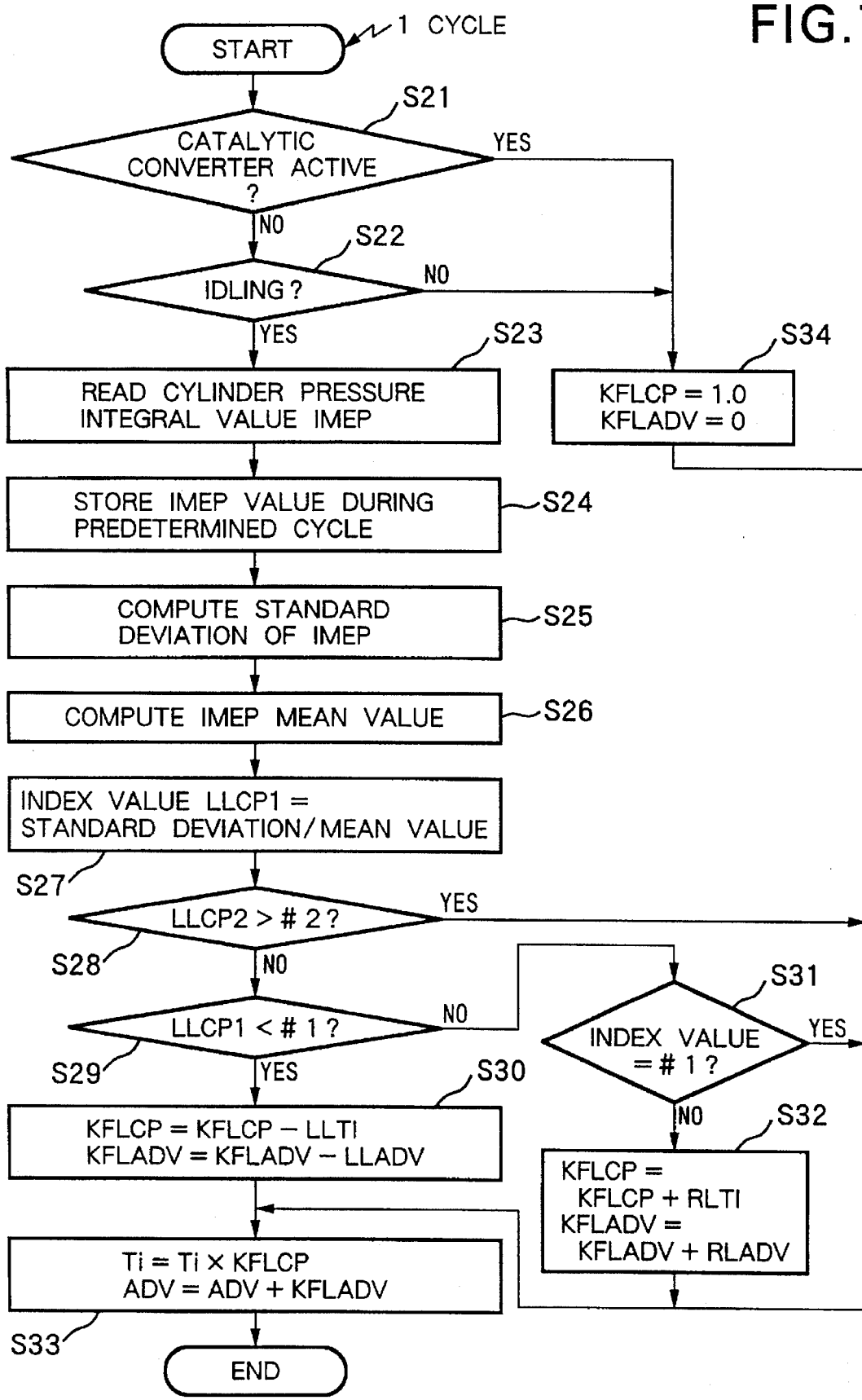
FIG. 7 is a flow chart illustrating the control contents of a second embodiment.
Figure 8:
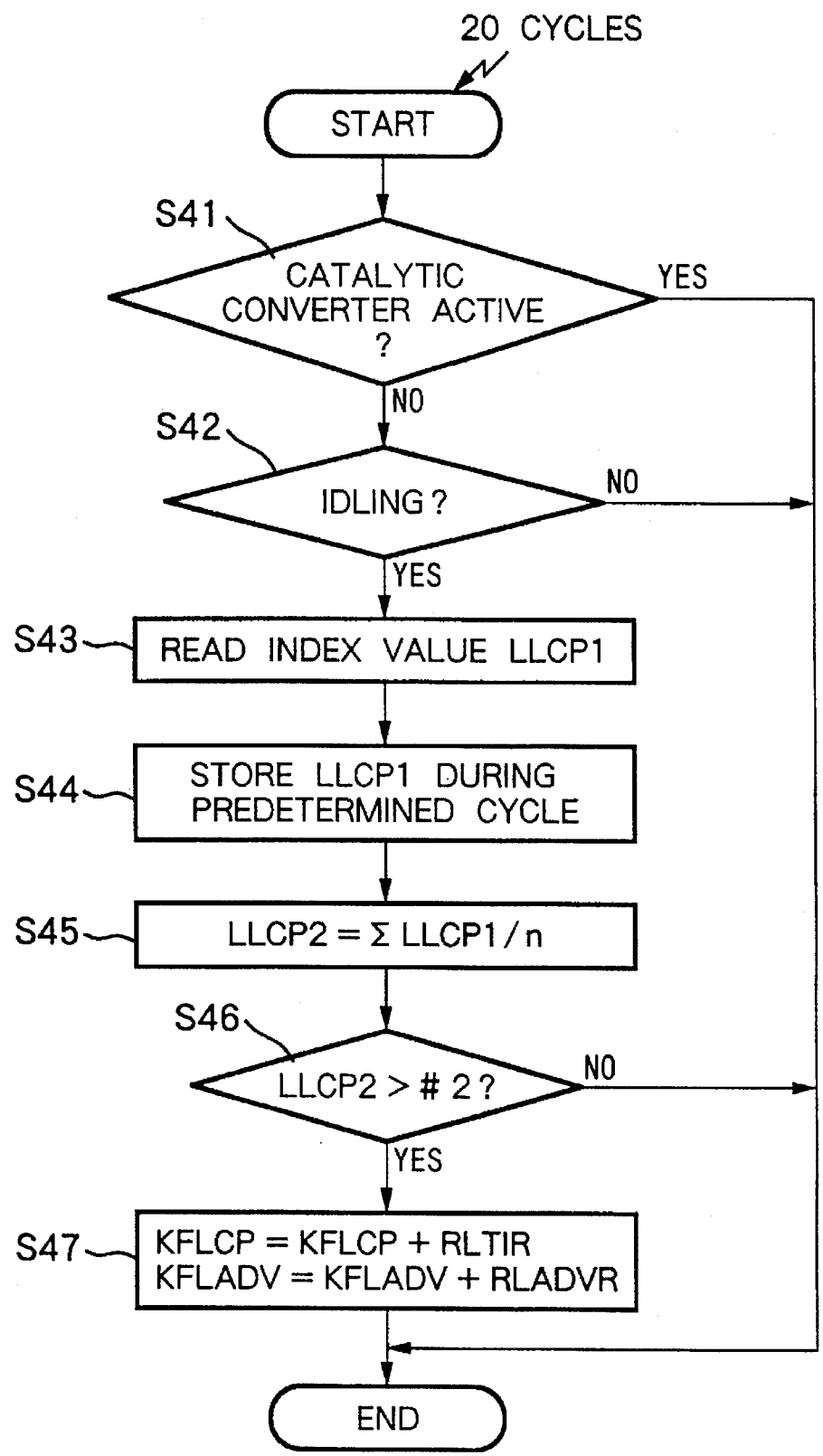
FIG. 8 is another flow chart illustrating the control contents of the second embodiment.

Next is a description of a second embodiment of a control in accordance with the flow charts of FIG. 7 and FIG. 8, where under non active conditions of the catalytic converter 10 and at the time of idling operation, the air-fuel ratio is weakened and the ignition timing retarded within a range wherein the output fluctuation limit is not exceeded. With this embodiment, the functions of the standard deviation computing device, the mean value computing device, the index value computing device, the first control device, the mean index value computing device, the second control device, (refer to FIG. 3), and a short cycle control terminating device, are realized by software illustrated by the flow charts of FIG. 7 and FIG. 8, and stored in the control unit 12.

With the flow chart of FIG. 7, as with the computational processing shown in the flow chart of FIG. 5, the output fluctuation limit is judged by comparing the index value which is obtained by dividing the standard deviation by the mean value, with the predetermined value #1. The air-fuel ratio and the ignition timing are then corrected in a direction so that the index value approaches the predetermined value #1. Description of the second embodiment is continued hereunder, with description of control common to the first embodiment abbreviated.

The flow chart of FIG. 7 is executed for each single combustion cycle. Initially in steps 21 and 22 it is judged if the catalytic converter is in non active condition, and if there is idling operation. If these conditions are both present, then in step 23 the cylinder pressure integral value IMEP is read. Then in step 24, updating of the stored data for the predetermined number of combustion cycles of the cylinder pressure integral value IMEP is carded out based on this latest data.

With the present embodiment, the predetermined number of combustion cycles for storing the stored data for the cylinder pressure integral value IMEP is made smaller than for the first embodiment (which was for example 1000 combustion cycles) to less than 20 combustion cycles, thereby ecomomizing on the capacity required for storing the cylinder pressure integral values IMEP.

In step 25, the standard deviation of the cylinder pressure integral value IMEP is obtained in accordance with the beforementioned equation 1, based on the stored data. In step 26, the mean value of the cylinder pressure integral value IMEP is computed based on the stored data, and in step 27, the standard deviation/mean value is computed as an index value LLCP1.

In step 28, it is judged if a different index value LLCP2 to be described later (a mean value of the index value LLCP1) has exceeded a predetermined value #2. If the index value LLCP2 has exceeded the predetermined value #2, that is to say, when based on the index value LLCP2, it is judged that the output fluctuation limit has been exceeded, the program is terminated without carrying out judgment of the output fluctuation limit by comparing the index value LLCP1 and the predetermined value #1, and increase correction of the correction coefficients KFLCP, KFLADV, based on the judgment results.

When the index value LLCP2 is equal to or less than the predetermined value #2, control proceeds on to step 29 and the subsequent steps in order to execute control based on the index value LLCP1, and as with steps 8 through 12 of the flow chart of FIG. 5, controls the air-fuel ratio and the ignition timing so that the index value LLCP1 approaches the predetermined value #1 (steps 29-33).

Referring back to steps 21 and 22, when judged that the control conditions have not been established, control proceeds to step 34 where processing to reset the correction coefficients KFLCP, KFLADV to their initial values is carried out.

The flow chart of FIG. 8 is executed every 20 combustion cycles, being a longer execution period than that for the flow chart of FIG. 7. When judged in steps 41 and 42 that the catalytic converter is non active and that there is idling operation, then in step 43, the latest computed index value LLCP1 is read.

Then in the next step 44, data storage for the latest eight cycles (eight cycles with the execution period of the present program as one cycle) portion of the index value LLCP1 read for each execution cycle of the program, is carded out. That is to say, while the index value LLCP1 is computed for each single combustion cycle, this is only sampled every 20 combustion cycles and the sampling data for the last eight times stored.

In step 45, the mean value of the eight index values LLCP1 is computed, and this mean value is made the index value LLCP2.

In step 46, the index value LLCP2 (mean value of the index value LLCP1) and a predetermined value #2 are compared, and when the index value LLCP2 exceeds the predetermined value #2, that is to say, when judged based on the index value LLCP2, that the output fluctuation limit has been exceeded, control proceeds to step 47, where increase correction of the correction coefficients KFLCP, KFLADV is carried out, based on predetermined values RLTIR, RLADVR.

That is to say, the control (second control device) based on the index value LLCP2 (mean value of the index value LLCP1) is limited to enriching the air-fuel ratio and advance angle correction of the ignition timing, when judged that the index value LLCP2 exceeds the predetermined value #2 and hence the output fluctuation limit has been exceeded.

Since scatter occurs in the cylinder pressure integral value IMEP, then it is desirable to sample the cylinder pressure integral value IMEP over a long combustion cycle, and compute the index value LLCP1 based on the large amount of stored data. However, a large amount of storage capacity then becomes necessary in order to store the cylinder pressure integral value IMEP.

Therefore, rather than suppressing the number of storages related to the cylinder pressure integral value IMEP, the index value LLCP1 computed for each one combustion cycle based on the cylinder pressure integral value IMEP is sampled every 20 combustion cycles, and the mean value of the last eight data for the index value LLCP1 sampled each 20 combustion cycles obtained. This mean value of the index value LLCP1 is then made the index value LLCP2.

Since the index value LLCP2 effectively becomes a value with a larger number of cylinder pressure integral values IMEP than the index value LLCP1 as its base (when the index value LLCP1 is computed based on the cylinder pressure integral value IMEP for the 20 combustion cycle portion, then this results in an IMEP value for 20×8 combustion cycles portions becoming the base), then as well as economizing on the number of storages of the cylinder pressure integral value IMEP, it becomes an index value wherein influence from scatter of the cylinder pressure integral values IMEP is eliminated.

Consequently when, based on the index value LLCP2, it is judged that the output fluctuation limit has been exceeded, then even if the index value LLCP1 is equal to or less than the predetermined value #1, it is in practice assumed that the output fluctuation limit has been exceeded. Therefore in order to reliably execute air-fuel ratio enrichment and ignition timing advance, control based on the index value LLCP1 according to the processing of step 28 of the flow chart of FIG. 7 is stopped, and the air-fuel ratio enrichment and ignition timing advance is executed according to the flow chart of FIG. 8.

Here, since the index value LLCP2 is updated/computed every 20 combustion cycles, then when judged that the index value LLCP2 has exceeded the predetermined value #2, the adjustment of the air-fuel ratio and the ignition timing is stopped until the next update timing of the index value LLCP2 (after 20 combustion cycles). Control based on the index value LLCP1 is not resumed until it is judged, based on the index value LLCP2, that the output fluctuation limit is not being exceeded.

In the condition wherein it is judged, based on the index value LLCP2, that the output fluctuation limit is not being exceeded, then weakening of the air-fuel ratio and retarding of the ignition timing is proceeded with good response, based on the index value LLCP1.

With the flow chart of FIG. 7, the construction is such that the index value LLCP1 is computed as the standard deviation/mean value. However, a construction is also possible wherein (maximum value–minimum value)/mean value is made the index value LLCP1. However, since the (maximum value–minimum value)/mean value is susceptible to influence from scatter of the cylinder pressure integral value, then the standard deviation/mean value is preferably used for the index value LLCP1.

Moreover with the second embodiment also, the construction may be such that only one of the air-fuel ratio and the ignition timing is controlled, and at the stage wherein one or other exceeds the control range, the control is changed to the other.

Moreover, the abovementioned respective embodiments only show judgment of the output fluctuation limit when the catalytic converter is non active and there is idling operation. However, it will be clear that judgment of the output fluctuation limit with standard deviation/mean value or (maximum value–minimum value)/mean value as the index, is not limited to the abovementioned operating conditions.

I claim:

1. An apparatus for detecting output fluctuations of an internal combustion engine comprising:

cylinder pressure detecting means for detecting the cylinder pressure of the engine, cylinder pressure integrating means for integrating the cylinder pressure detected by said cylinder pressure detecting means over a predetermined integration interval to obtain a cylinder pressure integral value, standard deviation computing means for computing a standard deviation of said cylinder pressure integral value during a predetermined number of cycles, mean value computing means for computing a mean value of said cylinder pressure integral value during said predetermined number of cycles, output fluctuation limit judging means for judging a limit of the output fluctuations, using a value of said standard deviation divided by said mean value as an index value, and engine control means which controls at least one of the ignition timing and the air-fuel ratio of the internal combustion engine, based on the judgment results for the output fluctuation limit from said output fluctuation limit judging means, only under non active conditions of an exhaust gas purification catalytic converter and during idling of the engine.

2. An apparatus for detecting output fluctuations of an internal combustion engine comprising:

cylinder pressure detecting means for detecting the cylinder pressure of the engine, cylinder pressure integrating means for integrating the cylinder pressure detected by said cylinder pressure detecting means over a predetermined integration interval to obtain a cylinder pressure integral value, maximum and minimum value detecting means for respectively detecting the maximum value and minimum value of said cylinder pressure integral value during a predetermined number of cycles, mean value computing means for computing a mean value of said cylinder pressure integral value during said predetermined number of cycles, output fluctuation limit judging means for judging a limit of the output fluctuations, using a value of the difference between said maximum value and minimum value divided by said mean value as an index value, and engine control means which controls at least one of the ignition timing and the air-fuel ratio of the internal combustion engine, based on the judgment results for the output fluctuation limit from said output fluctuation limit judging means, only under non active conditions of an exhaust gas purification catalytic converter and during idling of the engine.

3. A method of detecting output fluctuations of an internal combustion engine including steps of:

detecting the cylinder pressure of the engine, integrating the cylinder pressure of the engine over a predetermined integration interval, computing a standard deviation of the cylinder pressure integral value during a predetermined number of cycles, computing a mean value of the cylinder pressure integral value during said predetermined number of cycles, judging a limit of the output fluctuations using a value of said standard deviation divided by said mean value as an index value, and controlling at least one of the ignition timing and the air-fuel ratio of the internal combustion engine based on judgment results of an output fluctuation, wherein at least one of the ignition timing and the air-fuel ratio of the internal combustion engine are controlled only under non active conditions of an exhaust gas purification catalytic converter and at the time of idling of the engine.

4. A method of detecting output fluctuations of an internal combustion engine including steps of:

detecting the cylinder pressure of the engine, integrating the cylinder pressure of the engine over a predetermined integration interval, respectively detecting a maximum value and a minimum value of said cylinder pressure integral value for a predetermined number of cycles, computing a mean value of said cylinder pressure integral value for said predetermined number of cycles, and judging a limit of the output fluctuations using a value of the difference between said maximum value and minimum value divided by said mean value as an index value, and controlling at least one of the ignition timing and the air-fuel ratio of the internal combustion engine based on judgment results of the output fluctuation limit, wherein at least one of the ignition timing and the air-fuel ratio of the internal combustion engine are controlled only under non active conditions of an exhaust gas purification catalytic converter and at the time of idling of the engine.

5. An apparatus for controlling an internal combustion engine comprising;

cylinder pressure detecting means for detecting the cylinder pressure of the engine, cylinder pressure integrating means for integrating the cylinder pressure detected by said cylinder pressure detecting means over a predetermined integration interval to obtain a cylinder pressure integral value, standard deviation computing means for computing a standard deviation of said cylinder pressure integral value during a predetermined number of cycles, mean value computing means for computing a mean value of said cylinder pressure integral value during said predetermined number of cycles, index value computing means for computing for each predetermined number of update cycles, a value of said standard deviation divided by said mean value as an index value for judging an output fluctuation limit, first control means for carrying out judgment of the output fluctuation limit, based on said index value, and controlling at least one of the ignition timing and the air-fuel ratio of the internal combustion engine, based on the judgment results, mean index value computing means for computing a mean value of said index value during a predetermined number of cycles, for each predetermined number of update cycles which is larger than the number of update cycles for the index value in said index value computing means, and second control means for carrying out judgment of the output fluctuation limit, based on the mean value of said index value, and controlling at least one of the ignition timing and the air-fuel ratio of the internal combustion engine, based on the judgment results.

6. An apparatus for controlling an internal combustion engine according to claim 5, wherein said first and second control means judge the output fluctuation limit by comparing the index value or the mean value of the index value with a predetermined value, and control at least one of the ignition timing and the air-fuel ratio of the internal combustion engine so that the index value or the mean value of the index value approaches said predetermined value.

7. An apparatus for controlling an internal combustion engine according to claim 5, wherein terminating means is provided which terminates control by said first control means until the next update/computation timing of said mean value of the index value when, based on said mean value of the index value, it is judged that the output fluctuation limit is exceeded.

8. An apparatus for controlling an internal combustion engine according to claim 5, wherein said first and second control means judge the limit of the output fluctuations only under non active conditions of an exhaust gas purification catalytic converter and at the time of idling of the engine, and control at least one of the ignition timing and the air-fuel ratio of the internal combustion engine.

9. A method of controlling an internal combustion engine including steps of; detecting the cylinder pressure of the engine, integrating the cylinder pressure of the engine over a predetermined integration interval, computing a standard deviation of the cylinder pressure integral value during a predetermined number of cycles, and computing a mean value of the cylinder pressure integral value during said predetermined number of cycles, and computing for each predetermined number of update cycles, a value of said standard deviation divided by said mean value as an index value for judging an output fluctuation limit, and computing a mean value of said index value during a predetermined number of cycles for each predetermined number of update cycles which is larger than the number of Update cycles of said index value, judging the output fluctuation limit based on said index value, and controlling at least one of the ignition timing and the air-fuel ratio of the internal combustion engine, based on said judgment result, and judging an output fluctuation limit based on the mean value of said index value, and controlling at least one of the ignition timing and the air-fuel ratio of the internal combustion engine based on said judgment result.

10. A method of controlling an internal combustion engine according to claim 9 including steps of; judging the output fluctuation limit by comparing said index value or the mean value of said index value with a predetermined value, and controlling at least one of the ignition timing and the air-fuel ratio of the internal combustion engine so that said index value or the mean value of said index value approaches said predetermined value.

11. A method of controlling an internal combustion engine according to claim 9 wherein when, based on the mean value of said index value, it is judged that the output fluctuation limit is exceeded, the control based on said index value is terminated until the next update/computation timing of said mean value of the index value.

12. A method of controlling an internal combustion engine according to claim 9 including steps of; judging a limit of the output fluctuations only under non active conditions of an exhaust gas purification catalytic converter and at the time of idling of the engine, and controlling at least one of the ignition timing and the air-fuel ratio of the internal combustion engine.

* * * * *